W. TOWNSEND.
COVER RELEASER.
APPLICATION FILED JUNE 8, 1914.
1,169,697.
Patented Jan. 25, 1916.
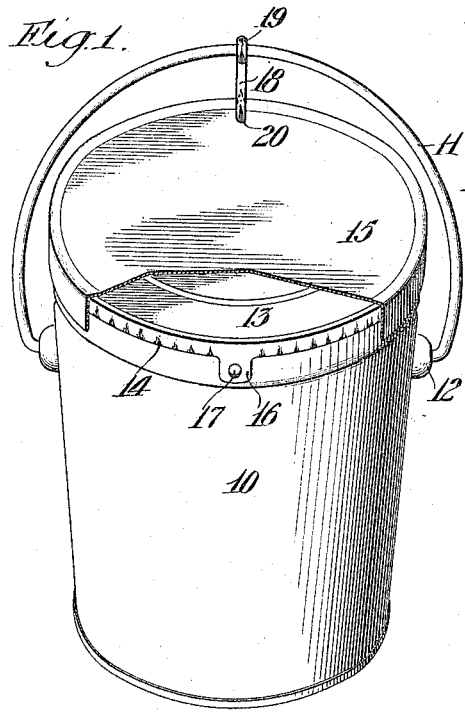
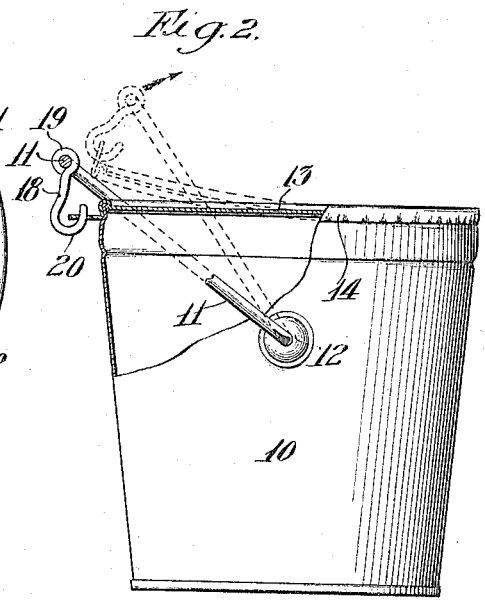
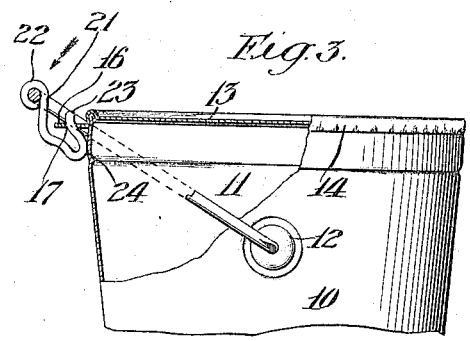
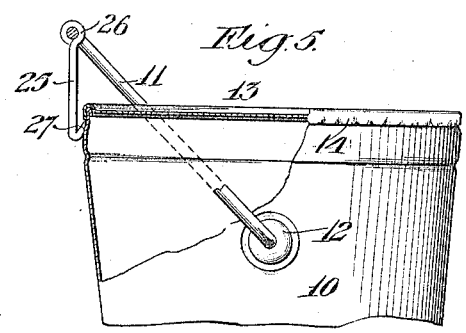
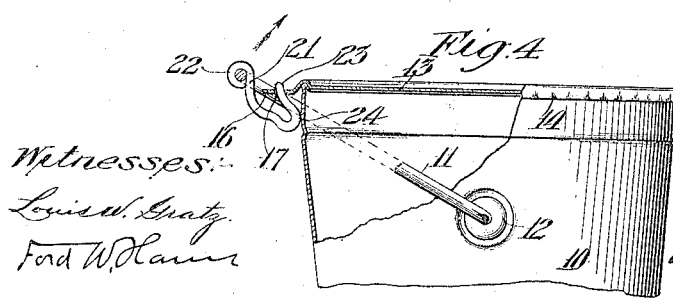
Witnesses:
Louis W. Gratz
Ford W. Harris
Inventor
Wilber Townsend
by Rinard & Graham
his attorneys
THE COLUMBIA PLANOGRAPH CO., WASHINGTON, D. C.

UNITED STATES PATENT OFFICE.

WILBER TOWNSEND, OF LOS ANGELES, CALIFORNIA.

COVER-RELEASER.

1,169,697.  Specification of Letters Patent.  Patented Jan. 25, 1916.

Application filed June 8, 1914. Serial No. 843,862.

*To all whom it may concern:*

Be it known that I, WILBER TOWNSEND, a citizen of the United States, residing at Los Angeles, in the county of Los Angeles, State of California, have invented a new and useful Cover-Releaser, of which the following is a specification.

The invention relates to metal containers and one of the principal objects of the invention is to provide means for easily releasing the covers from such containers.

The invention is shown applied to a pail, such as is commonly used for containing lard, but it may obviously be applied to similar containers used for other purposes. In such containers it is common practice to provide an inner sealing cover which is firmly secured to the container which is covered by an outer loose cover. The sealing cover forms a hermetical seal and requires considerable effort to remove it, especially as a partial vacuum often exists in the container. After it is removed the outer cover is used to keep the contents clean until they are entirely removed from the container.

The principal object of the invention is to provide means for quickly and easily loosening and removing the inner cover.

In the drawings, which are for illustrative purposes only, Figure 1 is a perspective view of a lard pail provided with my invention having a sealing cover and an ordinary cover, the ordinary cover being partially broken away to disclose the sealing cover in place on the rim of the pail. Fig 2 is a side elevation of a lard pail with the ordinary cover removed, showing the sealing cover crimped in place on the rim, a portion of the pail and cover being broken away to show the contact of the sealing cover with the rim of the pail. This figure also shows one manner of applying my invention, the first movement in the act of removing the cover being shown in solid lines, while the second movement is indicated in dotted lines. Fig. 3 is a fragmentary view of a lard pail with the ordinary cover removed, and another form of my invention for removing the sealing cover, a portion of the pail and sealing cover being broken away for purposes of illustration. Fig. 4 is a similar view to Fig. 3 showing the first movement in breaking the seal of the sealing cover with the form of device shown in Fig. 3. Fig. 5 is a fragmentary view of a lard pail, a portion of the top being broken away showing another application of my invention.

In these drawings, 10 is a pail equipped with a handle or bail 11 which is pivoted in bearings 12. A sealing cover 13 is tightly crimped on the rim of the pail as indicated by 14, and an outer cover 15 is placed over the sealing cover 13. The above is the standard construction commonly used on lard pails and similar containers, and if the crimping 14 is properly done it is a difficult matter to release and remove the sealing cover 13. This sealing cover when once removed, however, is not replaced, the outer cover 15 being a sufficient cover for the pail while the contents of the same are being used.

In the form of my invention shown in Figs. 1 and 2, an ear 16 having a hole 17 therein is formed on the sealing cover, and when placed on the lard pail is positioned to be engaged by the releasing means hereinafter described. A catch 18 is slidably mounted on the bail 11 and has an eye 19 surrounding the bail, and is also provided with a hook 20 which is adapted to enter the hole 17 in the ear 16 in the form illustrated in Figs. 1 and 2. When the outer cover 15 is removed, the hook may be hooked into the hole 17 and by pulling strongly upwardly on the bail 11, the cover 13 will be disengaged from the top of the pail 10, the bail 11 forming a convenient and efficient leverage for exerting strain upon the edge of the cover 13 on one side thereof.

In the form of the invention shown in Figs. 3 and 4, an ear 16 provided with a hole 17 is dependent from the flange of the sealing cover, and a catch 21 adapted to engage in the hole in the ear is provided which consists of a wire hook having an eye 22, which surrounds the bail 11 and is slidable thereon, and having a hook 23 at its other end which is adapted to engage with the hole 17. Intermediate between the hook and eye is a shoulder 24 which is arranged to contact with the side of the pail 10 when the parts are in the position shown in Fig. 3. When the parts are positioned as shown in Fig. 3, and the bail is pushed downwardly in the direction as indicated by the arrow in Fig. 3, the hook will act as a fulcrum and will pull through the medium of the ear outwardly from the rim of the pail, and thus partially release the sealing cover 13 from its contact with the rim of the pail, and will break any vacuum which may exist under the sealing cover. The strain on the bail is then reversed and the hook will raise the sealing cover 13 and tear it off from the rim of the pail. The direction of the arrow in Fig. 4 indicates the direction in which the bail is to be actuated after the seal of the sealing cover has been broken, as above described.

In the form shown in Fig. 5, a cover releaser 25 is formed having an eye 26 which surrounds the bail 11 and is slidable thereon, and is provided at its other extremity with a sharp hook 27. This sharp hook is adapted to be forced under the edge of the sealing cover 13 which is of the ordinary form employed by lard packers. By engaging the hook 27 between the rim of the pail and the flange of the sealing cover, the point of the hook 27 may be forced therebetween by pulling upwardly on the bail 11, the first action of the entry of the point of the hook 27 between the cover and pail being to force the flange of the cover away from the rim of the pail and thereby break the vacuum within the pail, after which a further upward pull on the bail will tear the cover from its seat on the rim of the pail. The cover 13 may be smoothly crimped on the pail 10 or it may be slightly corrugated to admit the releaser 25. When not in use the cover releaser is slid around on the bail to a point near the bearing 12 where it is out of the way.

My invention should not be confused with cover releasers which are fixed to the body of the container and work on the principal of a cam. My invention is adapted to be placed on the bail or handle of a container, and is normally carried at the side of the container in a convenient and inconspicuous position. When it is desired to remove the cover the lid lifting device is slid around to the center of the bail, the bail thereafter being used as a handle for the actuating of the lid lifting device.

What I claim as new is:—

1. In combination, a sheet metal container, a metal cover arranged in sealing engagement therewith, a bail pivoted on the container and adapted to serve as a supporting handle therefor, means carried by said bail adapted to be brought into engagement with one portion of the lower edge of the metal cover to force it outwardly from the wall of the container and then disengage the cover from the container by actuating the bail.

2. In combination, a sheet metal container, a metal cover therefor in sealing engagement therewith, a bail pivoted on the container and adapted to serve s a supporting handle therefor, cover engaging means carried on the bail arranged and adapted to engage with the cover to force a portion thereof outwardly from the container and then lift the same from the container by a movement of the bail.

3. In combination, a container, a sealing cover secured thereto, a bail loosely pivoted at either side of said container and extending upwardly in such a position as to serve as a supporting handle for the container, and means slidably mounted on said bail adapted to engage the under edge of said sealing cover to loosen the same from said container.

4. In combination, a container, a flanged sealing cover on such container, a bail pivoted on such container, a hook slidably carried on such bail having means adapted to be brought into engagement with the lower edge of the flange of the cover when said hook is centrally located on said bail to forcibly detach the flange of the cover from engagement with the rim of the container.

In testimony whereof, I have hereunto set my hand at Los Angeles, California, this 29th day of May, 1914.

WILBER TOWNSEND.

In presence of—
FRANK L. A. GRAHAM,
E. HARDESTY.

Copies of this patent may be obtained for five cents each, by addressing the "Commissioner of Patents, Washington, D. C."